Nov. 13, 1956
M. H. GROVE
2,770,441
FLUID PRESSURE REGULATOR
Filed Oct. 1, 1951
3 Sheets-Sheet 1
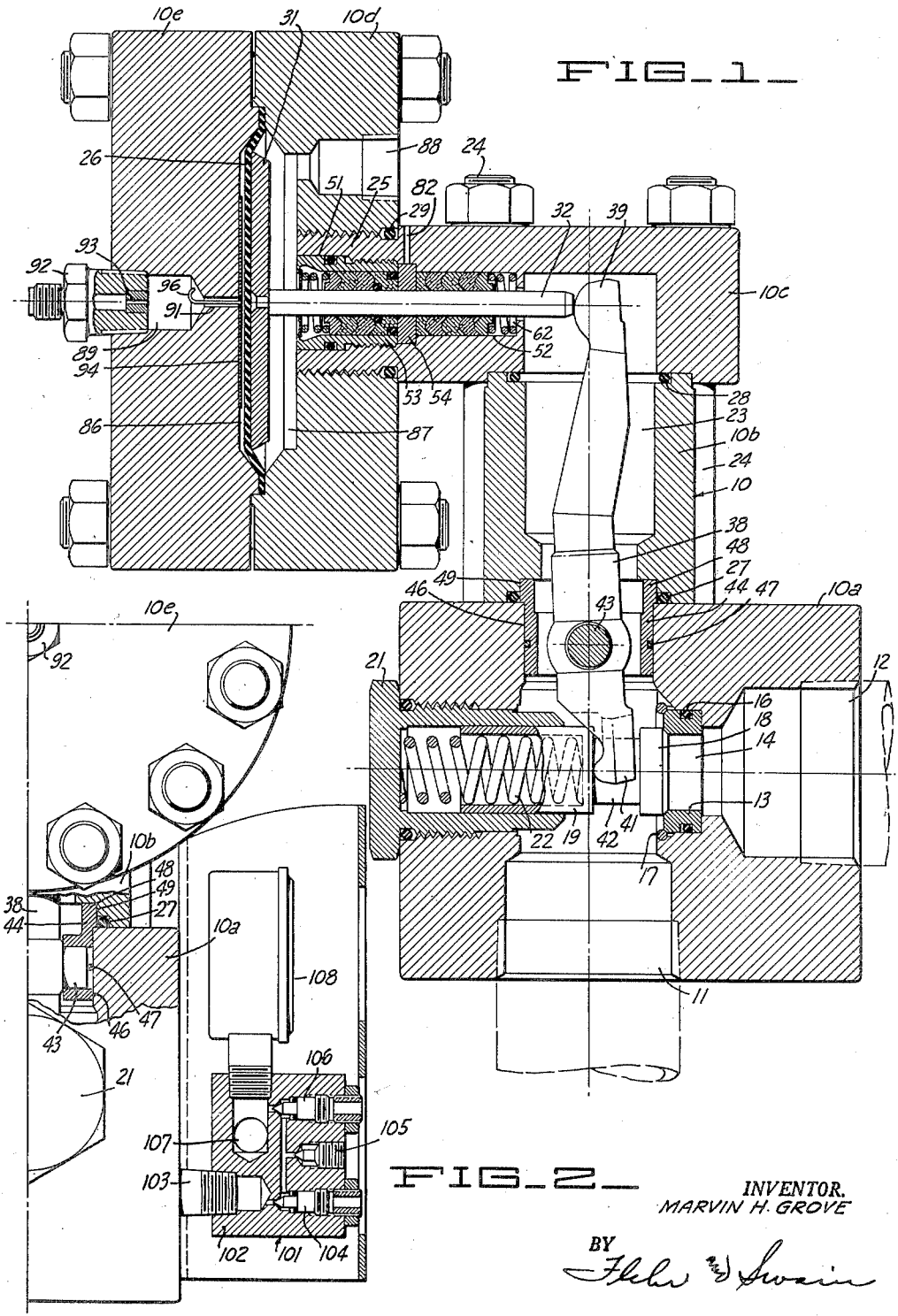
INVENTOR.
MARVIN H. GROVE
BY
*Flehr & Swain*
ATTORNEYS Nov. 13, 1956
M. H. GROVE
2,770,441
FLUID PRESSURE REGULATOR
Filed Oct. 1, 1951
3 Sheets-Sheet 2
FIG_3_
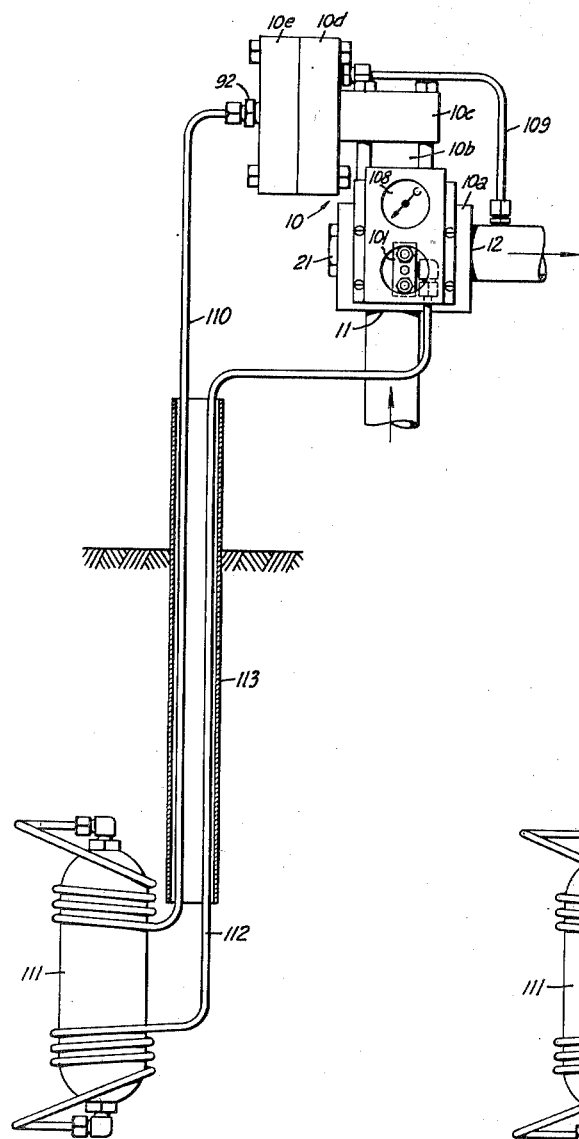
FIG_4_
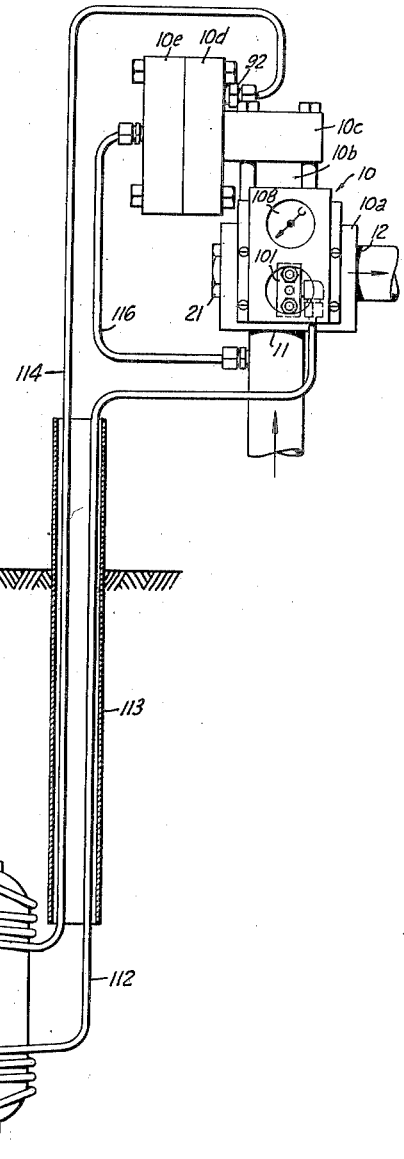
INVENTOR.
MARVIN H. GROVE
BY
ATTORNEYS Nov. 13, 1956     M. H. GROVE     2,770,441
FLUID PRESSURE REGULATOR
Filed Oct. 1, 1951                     3 Sheets-Sheet 3
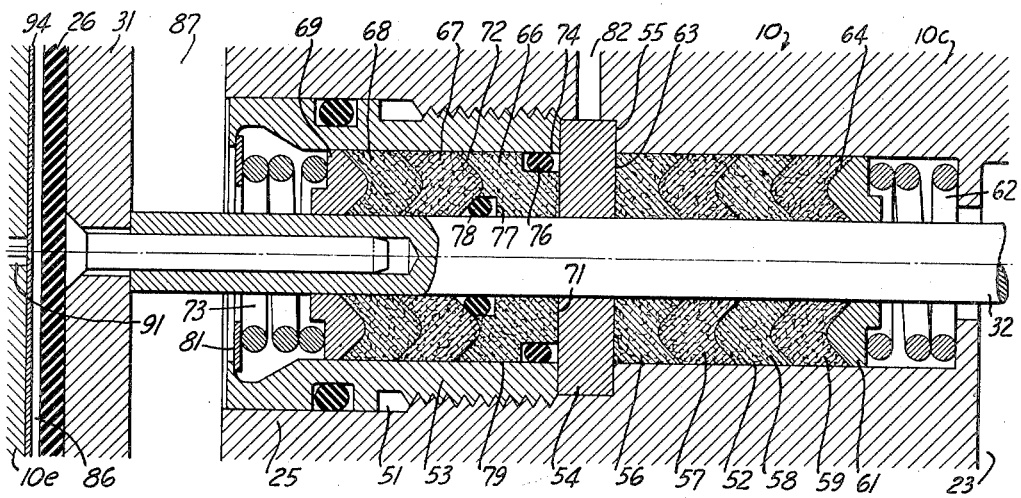
FIG_5_
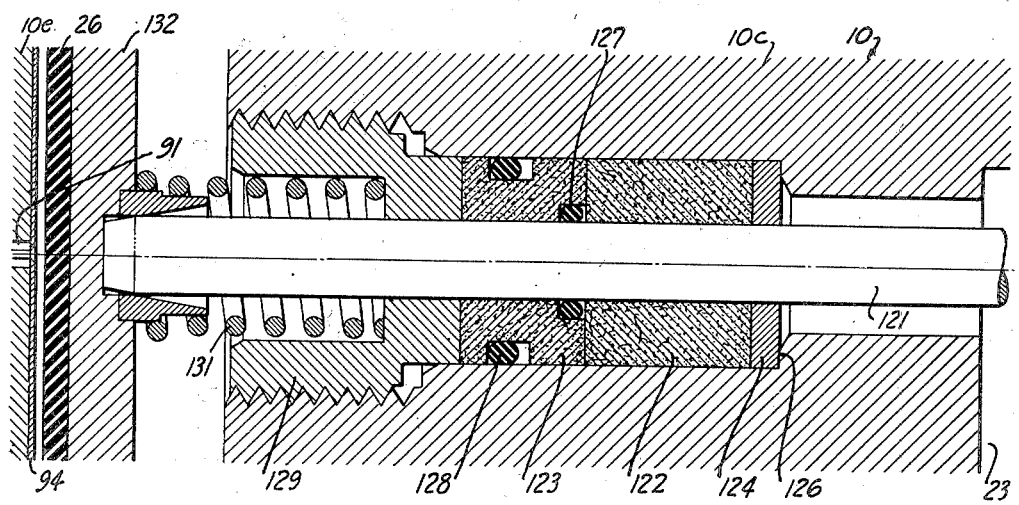
FIG_6_
INVENTOR.
MARVIN H. GROVE
BY
ATTORNEYS

United States Patent Office 2,770,441
Patented Nov. 13, 1956

2,770,441
FLUID PRESSURE REGULATOR

Marvin Henry Grove, Piedmont, Calif., assignor to Grove Valve and Regulator Company, Oakland, Calif., a corporation of California Application October 1, 1951, Serial No. 249,201

2 Claims. (Cl. 251—58)

This invention relates generally to the construction of devices for controlling flow of various fluids, particularly fluids at relatively high pressures.

In many fields of application where it is desired to control the flow of fluids it is desirable to provide a device capable of functioning either as a pressure reducing regulator, or a back pressure regulator. Also it is desirable for the same device to be capable of control from a source of controlling pressure which may be independent of either the inflow or the outflow pressures. Grove 2,511,844 discloses a regulating device which can be used in this manner. The operating diaphragm in that instance is connected to the movable valve members through a rocker arm, and the pivotal mounting of the rocker arm has a sealed joint with the regulator body. Thus the chambers on both sides of the operating diaphragm are sealed with respect to the line to enable the device to be connected whereby it functions either as a pressure reducing regulator or a back pressure regulator.

It has been found that sealed rocker arm joints of the type disclosed in Grove 2,511,844 are relatively difficult and expensive to manufacture. The particular pivotal mounting disclosed in Patent 2,511,844 involves use of a pivot pin which extends through the body, and thus it is necessary to remove a number of parts before the pivotal mounting together with the rocker arm, can be removed.

In general it is an object of the present invention to provide an improved regulating device of the type disclosed in said Patent 2,511,844.

More specifically it is an object of the invention to provide a device of the above character with improved means for sealing the chamber on one side of the operating diaphragm, with respect to the flow passages.

Another object of the invention is to provide a device of the above character having an improved and simplified pivotal mounting for the rocker arm.

Another object of the invention is to provide improved sealing means for the operating stem of a fluid pressure regulator, which will be capable of withstanding relatively high differential pressures without offering undue friction to movements of the stem.

Additional objects and features of the invention will appear from the following description in which the preferred embodiment has been set forth in detail in conjunction with the accompanying drawing.

Referring to the drawing:

Figure 1 is a side-elevational view in section, illustrating a regulating device incorporating the present invention.

Figure 2 is a quarter plan view, partly in section, illustrating the needle valve means which can be utilized with the regulator of Figure 1, for securing the desired loading of the operating diaphragm.

Figure 3 is a side elevational view illustrating installation of the device of Figure 1 and connections to cause the device to function as a pressure reducing regulator.

Figure 4 is a view like Figure 3 but showing connections for operation as a back pressure regulator.

Figure 5 is a cross-sectional detail on an enlarged scale showing the sealing means surrounding the operating stem for the device of Figure 1.

Figure 6 is a cross-sectional detail like Figure 5, but illustrating a modification of the invention.

The regulating device illustrated in Figure 1 consists of a body designated generally at 10, and which in this instance is formed of the several parts 10a, 10b, 10c, 10d and 10e. The body part 10a is formed with the inflow and outflow passages 11 and 12, which are adapted to make connection with associated piping as illustrated. A valve seat ring 13 is mounted in the body whereby its orifice 14 connects the inflow and outflow passages. This seat ring is shown sealed with respect to the body by suitable means such as the resilient O ring 16, and it is removably held in place by suitable means such as the spring snap-in ring 17.

The movable valve member 18 is shown mounted upon the piston or plunger 19 which in turn is guided within the fitting 21. Compression spring 22 urges the valve member towards closed position.

The body part 10b can be annular in contour, and is hollow to provide the space 23 that is in free communication with the inflow side of the valve. This body part extends between the parts 10a and 10c, and the three body parts are clamped tightly together by the bolts 24.

One side of the body part 10c is provided with a stud 25 having threaded engagement with the body part 10d. The body parts 10d and 10e can be conveniently circular in contour, and serve to mount the operating diaphragm 26. The various body parts are sealed with respect to each other by suitable means such as the resilient O rings 27, 28 and 29.

The diaphragm 26 can be made of resilient material suitable for the service to which the device is to be used. Thus it can be made of various synthetic rubbers, or a material like "Teflon." It can be made as a solid layer of material, or may be laminated. For example it may be made of a suitable synthetic rubber having one or both sides of the same protected by a thin layer of "Teflon."

A rigid diaphragm plate 31 engages one side of the diaphragm, and in turn is operatively connected to the stem 32. The stem extends through sealing means to be presently described in detail, and engages the rocker arm 38. The rocker arm has one end portion 39 which abuts the adjacent end of the stem 32, and another bifuracted end portion 41, which operatively connects with the valve member 18. The two branches of the bifurcated end portion extend upon opposite sides of the valve portion 42, which connects the plunger 19 with the valve member 18, and which is formed on a diameter less than that of the plunger.

The mounting for the rocker arm 38 includes a pivot pin 43 having its end portions carried by opposite side portions of the sleeve 44, and loosely retained by the snap-on ring 47. A bore 46 in the body part 10a serves to accommodate the sleeve and one end of the sleeve 44 is provided with an enlarged portion or flange 48, which is accommodated in the annular recess 49 provided in the body part 10b. Thus when the body parts 10a and 10b are clamped together the sleeve 44 is loosely locked within the body and is retained against movement in the direction of its axis. However, when bolts 24 are removed and the body parts 10a and 10b separated, the sleeve together with the rocker arm 38 can be removed.

The particular sealing means illustrated in Figures 1 and 5 for the stem 32, is as follows: The body part 10c is provided with aligned bores 51 and 52, which are aligned or concentric with the axis of the stem 32. The bore 51 is threaded to accommodate the threaded sleeve 53. The inner edge of the sleeve 53 clamps upon the peripheral margin of the divider disc 54. This disc is seated upon the annular shoulder 55, and serves to separate the two sections of the sealing means. One section of the sealing means is formed by the sealing members 56, 57, 58 and 59, which are accommodated in the bore 52. Member 56 seats upon one side of the dividing disc 54 and one end of the member 59 is engaged by the metal follower annulus 61. A compression spring 62 engages the annulus 61 and urges the same towards the disc 54.

All of the members 56—59 are made of a material capable of forming and maintaining a fluid tight seal between the stem and the body part 10c, and preferably from an "elastomer" base material having properties like "Teflon." "Nylon" can be employed although its lubricating properties are not as good as "Teflon." The members 57, 58 and 59 are chevron shaped in section, and are dimensioned to fit snugly about the stem 32, and within the bore 52. The end face 63 of member 56 is made flat to seat upon the adjacent flat face of the disc 54. One face 64 of member 61 is made V-shaped in cross-sectional contour as illustrated, to nest within the complementary face of member 59.

The other section of the sealing means consists of members 66, 67, 68 and 69. Members 67 and 68 are chevron shaped and made of material having the properties of "Teflon." Member 66 is likewise made of a material having the properties of "Teflon," and has one end 71 which is flat to engage the adjacent face of the separating disc 54 and another end 72 which is V shaped to fit the adjacent end face of member 67. Member 69 is engaged by the compression spring 73 whereby all of the members 66, 67, 68 and 69 are tightly pressed together and against the separating disc 54.

Member 66 is provided with the annular recess 74 for accommodating the resilient O ring 76. This O ring is compressed radially and serves to form a bubble tight fluid seal to prevent leakage between the member 66 and sleeve 53, and between the adjacent end portion of sleeve 53, and the separating disc 54. Member 66 is also provided with an annular recess 77 which serves to accommodate the resilient O ring 78. This O ring is likewise radially compressed and serves to prevent leakage between the members 66 and the stem 32. Both of the O rings 76 and 78 can be formed of suitable synthetic rubber.

Members 66, 67 and 68 are formed whereby they snugly fit the stem 32 and the sides of the bore 79 within the sleeve 53. Member 69 can be formed of suitable metal, and functions as a follower. The compression spring 73 can be made removable by holding the same in place by the expansible snap-in ring 81.

It is desirable to provide the body part 10c with a vent 82 which extends from the periphery of the recess 52. Any leakage through either sealing section is discharged to the atmosphere through this vent.

The two body parts 10d and 10e which serve to mount the diaphragm 26, form chambers 86 and 87 upon opposite sides of the diaphragm. A passage 88 is provided in body part 10d to facilitate making connection between chamber 87 and external piping. Chamber 86 is in communication with opening 89 through the duct 91, and this opening is shown connected to the fitting 92. A small flow restricting orifice 93 is shown in fitting 92 in order to restrict communication between a source of pressure connected to the fitting 92 and the chamber 86. A metal disc 94 is shown loosely disposed in chamber 86, and is attached to the pin or wire 96 which extends through the duct 91. By this arrangement the diaphragm 26 is protected against excessive pressure applied to the chamber 87, which might otherwise cause the material of the diaphragm to be extruded through the duct 91. Also this disc insures better distribution of pressure to the left face of the diaphragm as viewed in Figure 1, when the pressure in opening 89 exceeds that in chamber 87.

The fitting 92 connects to a pipe or tube which leads to a source of gas under pressure. As will be presently explained a source of loading gas can be a flask which can be charged with gas from the line by suitable means such as the loading device 101. This device can be of the type disclosed in Patent 2,519,333. It can consist of a body 102 connected by pipe 103 with body part 10a, and thereby placed in communication with the inflow passage 11. The body is provided with needle valves 104, 105 and 106. Duct 107 is in communication with the pressure gauge 108, and is adapted to connect with the loading flask. By opening both valves 104 and 106, gas can be bled from the inflow passage of the regulator and supplied to the flask to increase the loading pressure. During this loading operation needle valve 105 can form a fixed flow restricting bleed orifice. In order to reduce the loading pressure, valve 104 remains closed while valve 106 is opened. This serves to bleed gas from passage 107 to the atmosphere through the needle valve 105.

Figure 3 illustrates how external connections can be made to the regulator, where it is desired to employ the device for automatic pressure reduction. Tube 109 connects the outflow side of the regulator with the passage 88 and the chamber 87. Tube 110 connects the fitting 92 with the loading flask 111. The passage 107 of the loading device 101 is connected by tube 112 to the loading flask. It is desirable to bury the flask 111 below the ground level as illustrated, and to lead the tubes 110 and 112 through a protective conduit 113. Location of the loading flask below the ground aids in maintaining the same at a relatively constant temperature level.

Figure 4 illustrates how the device can be connected to function as a back pressure regulator. In this instance a tube 114 connects the passage 88 and chamber 87 with the loading flask 111. The fitting 92 is connected by tube 116 with the inlet side of the regulator. Tube 112 connects the duct 107 of the loading device 101 with the flask.

With the arrangement of Figure 3, a substantially fixed loading pressure is maintained in the space 86 to act upon the diaphragm. Controlling pressure is applied from the outflow side of the regulator to the chamber 87. Under such conditions the diaphragm acts to position the valve member in such a manner as to maintain a desired low pressure upon the outflow side.

With the arrangement of Figure 4 a substantially fixed loading pressure is maintained in the chamber 87. Thus loading pressure is applied through tube 114 from the flask 111. Controlling pressure is applied to the chamber 86, through the tube 116, whereby in effect the pressure in chamber 86 corresponds generally to the inflow pressure. For a given setting of the regulator, inflow pressure is maintained on the inflow side of the regulator, and when the set pressure is exceeded, the valve is automatically operated to vent pressure to the outflow side, thus tending to maintain the inflow pressure substantially constant.

The sealing means previously described for sealing about the operating stem 32 permits the use of either chambers 86 or 87 to maintain a fixed gas loading pressure. Assuming that loading pressure is applied to the chamber 87, it is essential that the sealing about the stem 32 be substantially bubble tight, because the loading pressure is maintained by virtue of a fixed quantity of trapped gas. The sealing means described with reference to Figure 5 is capable of maintaining a bubble tight seal about the stem, having reference particularly to the sealing means formed by the elements on the left hand side of the dividing disc 54 as viewed in Figure 5. The Teflon member 66 is somewhat compressed by the action of applied fluid pressure and the force of the spring 73. Such compression serves to press its outer and inner peripheral surfaces into intimate contact with the adjacent metal surfaces of the stem and the inner periphery of the sleeve 53. However, this intimate surface contact does not cause sufficient friction to prevent longitudinal movement of the stem as required for proper automatic regulation. The intimate surface to surface contact just described (i. e. zero clearance) provides highly effective conditions for the resilient O rings 76 and 78. These O rings insure a bubble tight seal, and because of their association with the member 66, they are capable of withstanding relatively high differential pressures without causing detrimental extrusion of the resilient rubber into clearances between the adjacent parts. The chevron rings 67 and 68 not only aid in providing an effective seal, but in addition they protect the resilient synthetic rubber O rings from contact with any detrimental material which may be contained in the gas applied to chamber 87.

That section of the sealing means formed by the Teflon members 56, 57, 58 and 59, may not be bubble tight, but it is sufficiently effective to prevent substantial leakage about the stem 32 from the space 23. The compression spring 62 maintains the outer and inner peripheries of these sealing members in sealing contact with the cooperating metal surfaces, but without causing such undue friction as to prevent proper movements of the stem for automatic regulation.

Figure 6 shows a simplified type of sealing means for the diaphragm stem. Thus in this instance the stem 121 corresponding to stem 32 of Figure 5, is surrounded by the sealing members 122 and 123, which are preferably formed of material having the properties of "Teflon." Member 122 abuts a metal disc 124, which is seated upon the annular body shoulder 126. The Teflon member 123 is provided with annular recesses to accommodate the resilient O rings 127 and 128. A metal follower 129 has threaded engagement with the body, and serves to retain the desired pressure upon the members 122 and 123. A like compression spring 131 surrounds the stem in this instance and urges the diaphragm plate 132 in one direction.

With the sealing means of Figure 6 sufficient pressure is continuously applied to the "Teflon" members 122 and 123 by the follower member 129 to maintain sealing contact between the inner and outer peripheries of these members, and the cooperating surfaces of the body and stem. However, this pressure is insufficient to prevent longitudinal movement of the stem as is required for automatic regulation. The resilient O rings 127 and 128 make the seal bubble tight, whereas some slight leakage might be permitted if the "Teflon" members 122 and 123 were used without such additional sealing means. Here again the resilient O rings are capable of withstanding relatively high pressures without unduly interfering with longitudinal movement of the stem 121.

I claim:

1. In a fluid pressure regulator of the type including a movable valve member cooperating with a valve seat for controlling flow of fluid and a fluid pressure operated member for operating the valve member, together with a body having one part serving to mount the valve seat and enclose the valve member and a second part detachably secured to the first part; means forming an operative connection between the fluid pressure operated member and the valve member comprising a lever disposed within the body, one end of the lever being disposed within the first part of the body and operatively connected to the valve member and the other end of the lever extending within the second part of the body and operatively connected to said fluid pressure operated member, a rigid sleeve, a pivot pin carried by diametrically opposite portions of said sleeve and providing a pivotal mounting for said lever, said first and second body parts having aligned bores formed therein for accommodating said sleeve, the ends of the pin terminating within the body and within one of said bores, and sealing means surrounding said sleeve and forming a seal between said first and second body parts, said sleeve having a portion of enlarged diameter at one end, a shoulder formed in the bore in said second body part, said enlarged portion fitting between said shoulder and said first body part to lock said sleeve against movement in a longitudinal direction relative to the body parts.

2. A device as in claim 1 in which the pivot pin is accommodated in openings provided in the said opposite portions of the sleeve and in which a snap-on ring embraces the sleeve and extends across the ends of the pin, the sleeve being grooved to accommodate the snap-on ring.

References Cited in the file of this patent

UNITED STATES PATENTS

| 1,171,519 | Hodgkinson | Feb. 15, 1916 |
| 1,716,705 | McEwan | June 11, 1929 |
| 2,012,957 | Cleveland | Sept. 3, 1935 |
| 2,021,053 | Englebright | Nov. 12, 1935 |
| 2,138,937 | Petroe | Dec. 6, 1938 |
| 2,210,826 | Williams | Aug. 6, 1940 |
| 2,348,004 | Gruetjen | May 2, 1944 |
| 2,479,711 | Arutunoff | Aug. 23, 1949 |
| 2,511,844 | Grove | June 20, 1950 |
| 2,567,527 | Parks | Sept. 11, 1951 |
| 2,683,992 | Price | July 20, 1954 |